United States Patent Office 3,360,239
Patented Dec. 26, 1967

3,360,239
OIL FREE TURBINE ASSEMBLY
Judson S. Swearingen, 500 Bel Air Road,
Los Angeles, Calif. 90024
Filed Dec. 4, 1964, Ser. No. 415,877
12 Claims. (Cl. 253—39)

ABSTRACT OF THE DISCLOSURE

The embodiment disclosed is a high speed turbo-expander whose shaft emerges from the turbine housing through a tapered clearance type seal in an axially adjustable heat insulating wall, which also moves axially with temperature changes to vary the seal clearance, to a bearing spaced from the wall. Seal gas is injected into the seal. Between the bearing and the insulating wall is another labyrinth seal to confine the bearing oil, a slinger to sling off any oil passing such seal, and a guard on the insulating wall to prevent oil flow along its outer surface toward the shaft.

---

Figure 1:
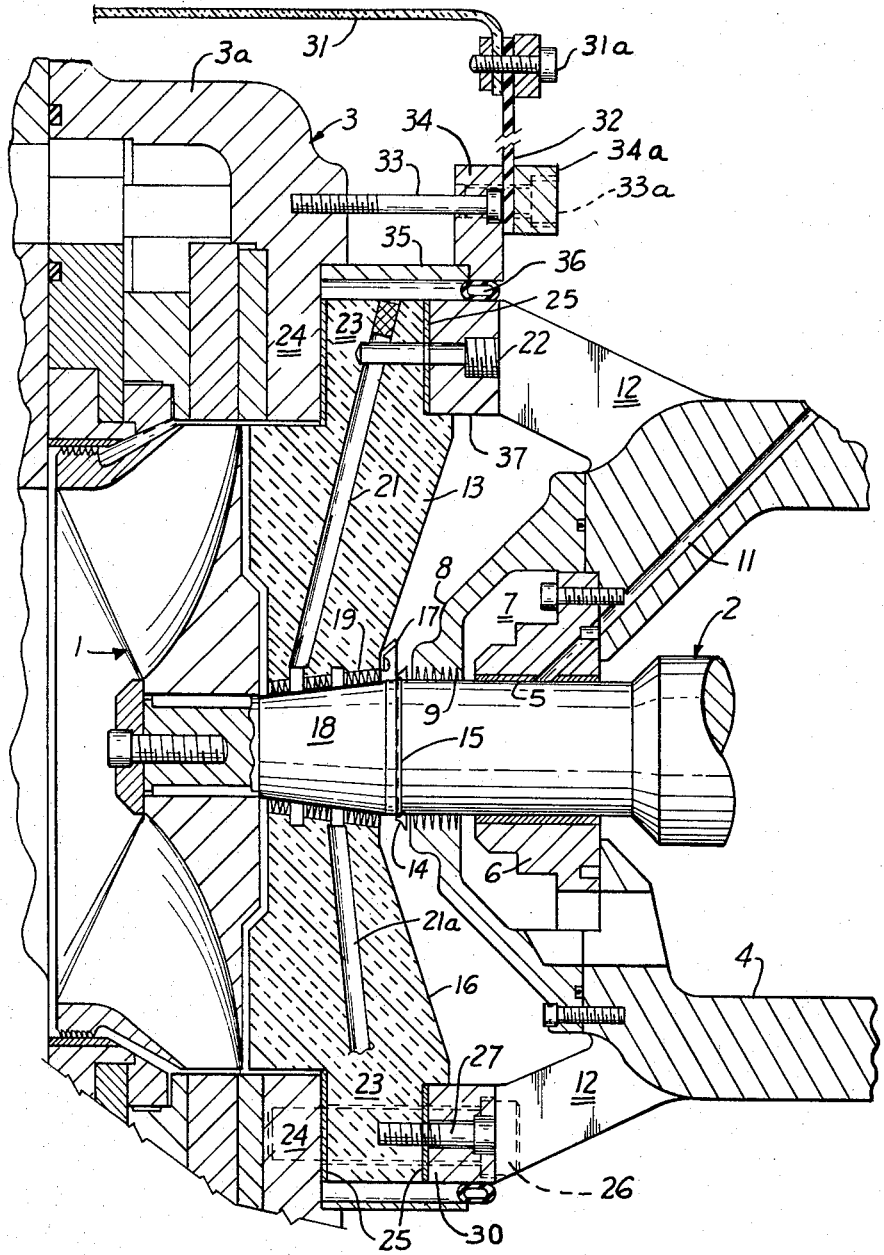

This invention relates to improvements in the arrangement of seals and cooperating elements around shafts in cryogenic turbo-expanders having bearings lubricated with a liquid lubricant, such as are widely used in the liquefaction of gases, for example, in consecutive condensation of components of air or production of liquified petroleum gases.

Turbo-expanders for cryogenic use usually include a turbine case having a heat insulating wall through which extends a shaft carrying turbine blades within the case. These turbines usually operate at high speed, as for example, 20,000 to 50,000 r.p.m. It is necessary that bearings in which the shaft is mounted be lubricated with a liquid lubricant, usually introduced under pressure, and a seal around the shaft is required to prevent liquid lubricant from flowing along the shaft into the turbine case. Entrance of liquid lubricant into the turbine case is very undesirable because at the low temperatures commonly present in the case, the lubricant usually solidifies and interferes with proper operation of the turbine, and in plants for separation of air into its components the lubricant, if combustible, forms a dangerously explosive mixture with liquid oxygen.

The high rotational speed of the turbine also presents problems of rigidity of the shaft and bearing assembly to avoid hazardous operation at or near critical speed. The speed at which centrifugal force tending to whip a rotating shaft sideways just balances the elastic stiffness tending to keep it straight is called the critical speed of the shaft. Equations including length of the shaft between bearings and diameter of the shaft as elements have been proposed for calculating critical speed, but is well known that the proposed equations should be checked against experience obtained empirically in designing a shaft and bearing assembly to avoid critical speed. It has been customary to locate a bearing for the turbine shaft very close to the wall of a turbine case through which it extends, to provide sufficient shaft stiffness to avoid critical speed thus leaving only limited room for a seal around the shaft.

Sealing elements carried by the case wall in position to make sliding, sealing contact with the shaft are impractical because at the high speed of the shaft such seals quickly wear and become inoperative. It is customary to use a seal in applications of this type which does not make contact with the shaft, as for example, labyrinth seals having a small clearance around the shaft, and to introduce air or other sealing gas under pressure between the seal and shaft so that a stream of gas flowing toward a point from which oil might enter acts as a seal to exclude oil. Frequently, this arrangement is not effective to prevent oil from entering the turbine case.

Labyrinth seals around a cylindrical shaft also have the disadvantage that they are not adjustable for wear. When the seal becomes worn, it must be replaced and replacement usually requires dismantling the turbine shaft and bearing assembly in order to replace a seal and disconnecting cold piping attached to the turbine case.

When a turbo-expander is first being started up, it is occasionally subjected to conditions not present during normal operation. For example, it may over-speed somewhat, or it may have deposits formed in the turbine wheel which will be derimed as soon as it gets past the ice point or the carbon dioxide point, or the parts may not have attained temperature equilibrium. These factors may cause runout or actual misalignment of the shaft at the labyrinth seal which would damage the seal during the start up period.

It is an object of this invention to provide an improved assembly of turbine shaft, heat insulating wall, shaft bearing, and shaft seals, especially useful in a cryogenic turbo-expander, which is highly effective in maintaining the interior of the turbine case in oil free condition during operation.

Another object is to provide an improved assembly of the above type which is detachable from a turbine case as a unit for inspection and repair without dismantling the remainder of the turbine case or disconnecting piping normally attached thereto.

Another object is to provide an improved assembly of turbine shaft, heat insulating wall of a turbine case, and seal having a small clearance around the shaft in which the seal is adjustable for wear.

Another object is to provide an assembly of turbine shaft, heat insulating wall and seal having a small clearance around the shaft which provides for delayed reduction of clearance between the seal and shaft after the turbo-expander is started.

Another object is to provide an assembly of the above type having a bearing chamber isolated from the turbine case in which liquid lubricant may be circulated under pressure in the bearing chamber.

Another object is to provide an assembly of the above type in which the seal is provided with means for introducing and withdrawing sealing gas and which is effective with low rate of flow of sealing gas.

Another object is to provide an improved seal between a stationary wall and a rotatable shaft extending therethrough in which any oil flowing along the shaft is thrown outward to impinge upon the wall at a distance from an opening through which the shaft extends, and any oil flowing along the wall toward the opening is conducted away from the opening.

Other objects and advantages will become apparent to those skilled in the art on consideration of the following detailed description and the drawings submitted herewith.

In the present invention a separate chamber is provided for a bearing supporting a turbine shaft, near to but spaced from, a heat insulating end wall of a turbine case. The bearing chamber includes a bearing supporting member preferably in a bearing case which is carried by supporting members, preferably in spider arrangement, rigidly attached to and carried by the heat insulating wall of the turbine case. The bearing supporting member preferably forms one wall of the bearing chamber and an opposite wall facing the heat insulating wall of the turbine case carries a clearance type seal surrounding the turbine shaft. The bearing and bearing supporting member preferably are equipped with a drilled opening for supplying a liquid lubricant under pressure to the bearing.

With this arrangement it will be seen that any lubricant working out of the bearing on the side opposite to the heat insulating wall of the turbine case will merely fall by gravity at a point sufficiently remote from the turbine case that it has no effect thereon, while the clearance type seal in the wall facing the turbine case minimizes flow of oil along the shaft toward the turbine case.

The heat insulating end wall of the turbine case preferably is made of an organic fiber reinforced plastic material. Materials of this type are readily available on the market and a great many of them are suitable for such use since they have low heat transfer characteristics and high compressive strength, although their tensile strength is poor. The wall preferably has a conical exterior surface sloping inward toward the center. At the center of this wall a conical opening tapering from the outside of the wall to the interior of the turbine case is provided to receive the turbine shaft which also has a tapered section matching the taper of the opening. A tapered seal having a small clearance between itself and the tapered section of the shaft is carried in the conical opening through the heat insulating wall.

A means for attaching the heat insulating wall to an adjacent member of the turbine case in adjustable position along the axis of the shaft is provided. The heat insulating wall itself preferably is circular and has an annular shoulder opposed to a matching shoulder on an adjacent member of the turbine case so that it can be held firmly in place by suitable attaching means such as machine screws. Shims of various thickness are provided so that the position of the wall with respect to the longitudinal axis of the turbine shaft may be varied, thus providing adjustment for the clearance type seal around the tapered portion of the shaft.

A means for introducing a sealing gas to the clearance seal is provided and preferably is merely a bore in the insulating wall and bearing support member connectable with a source of compressed gas. Preferably a slinger ring is disposed between the labyrinth seal carried by the bearing chamber wall and the conical seal in the heat insulating wall so that if any oil should pass from the bearing chamber through the first labyrinth seal under any unusual or abnormal circumstances it will be thrown outward against the tapered exterior surface of the heat insulating wall. A gutter is disposed to catch any oil running down the exterior of the conical surface of the heat insulated wall and to deflect it around the conical seal.

The conical tapers of the seal and shaft in the heat insulating wall inherently provide for a variation in clearance between the seal and shaft as a cryogenic turbo-expander becomes colder after it is placed in operation. It will be seen that a larger inner surface of this wall is exposed to the cold conditions on the interior of the turbine case while the exterior of the wall is exposed to atmospheric temperature. Contraction of the inner part of the wall occurs under the influence of the resulting heat gradient so that the interior of the wall tends to contract with respect to the exterior of the wall and the wall tends to dish or curve outward at the center so that the conical seal is moved along the tapered portion of the shaft axially and the clearance becomes smaller as the temperature within the case falls. It is believed that the construction and operation of this device may be more clearly understood from consideration of the following detailed description and attached drawings, wherein FIG. 1 illustrates schematically a part of a turbo-expander case including the novel assembly of parts of the present invention and FIG. 2 is an enlarged detail, in vertical section, illustrating a preferred "slinger ring" type seal for preventing oil from flowing along a shaft to a stationary wall.

Figure 2:
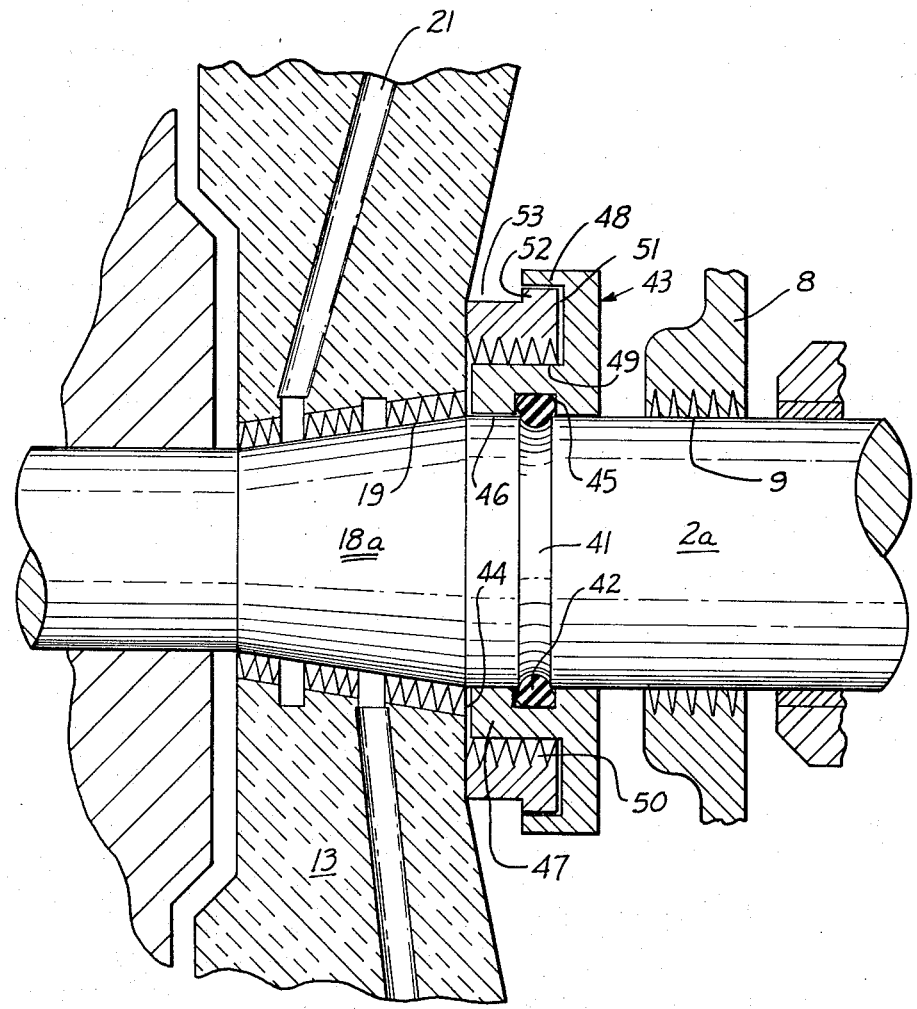

In FIG. 1, turbine blades forming a turbine wheel in a cryogenic turbo-expander 1 are mounted on a shaft designated generally as 2 for rotation inside a turbine case designated generally as 3. The shaft 2 is mounted for rotation in bearings supported in a bearing case 4 shown fragmentarily. Although only one bearing, illustrated as journal bearing 5, is shown, it is to be understood that a second bearing will be located in the opposite end of the bearing case 4.

The journal bearing 5 is illustrated as supported in a bearing support member 6 which in turn is supported by bearing case 4. Bearing supporting member 6 forms one wall of a bearing chamber 7, and the opposite wall of chamber 7 is formed by member 8, which is a detachable part of the bearing case and carries a seal of clearance type, illustrated as a labyrinth seal 9 surrounding shaft 2. A means for introducing a liquid lubricant under pressure into bearing 5 is illustrated as bore 11 in the bearing, bearing case, and bearing support member. The bearing case is provided with a plurality of members 12 in spider arrangement which are illustrated as integral with ring 30 firmly attached to and rigidly supported by heat insulating wall 13 of the turbine case, and provide a small space between the wall 8 of bearing chamber 7 and the surface 16 of the insulating wall 13.

Preferably a slinger ring 14 snapped into a groove 15 in shaft 2 is provided in the space between seal 9 and wall 13 so that if under any abnormal or unusual circumstances any oil should pass the labyrinth seal 9, it will be thrown outward to impinge upon the surface 16 of wall 13 at a distance from shaft 2. The insulating wall 13 carries a gutter 17 in position to prevent flow of oil to shaft 2 when the heat insulating wall extends vertically as illustrated, gutter 17 does not need to surround the entire shaft but merely has sufficient length to deflect oil flowing downward across the exterior of the heat insulating wall away from the shaft.

The heat insulating wall 13 is provided with a conical opening which decreases in diameter from the exterior of the wall to the interior surface thereof and shaft 2 has a conical section 18 of matching taper extending through the conical opening. A conical clearance type seal, illustrated as a labyrinth seal 19, surrounds the conical section 18 of the shaft and is provided with a means illustrated as bore 21 connectible at 22 to a line carrying compressed gas (not shown), for introducing a stream of gas under pressure into the space between the seal and shaft. Optionally, a conduit 21a may be provided for carrying seal gas out of the seal.

It will be seen that the spaced arrangement of labyrinth seal 9 and wall 13, the arrangement of slinger ring 14 and cooperating gutter 17 and the conical seal 19 in wall 13 are extremely effective in preventing the entrance of any lubricant into the interior of the turbine case where it might interfere with the operation of turbine 1.

The slinger ring 14 shown in FIG. 1, may be either screwed or shrunk onto shaft 2 and this construction may make it difficult to disassemble the shaft 2 from the insulating wall 13 without detaching the wall 13 from case 3 or removing bearing case 4 as there frequently will not be sufficient clearance between the ring 14 and seal 9 to permit the shaft to be withdrawn from wall 13 without removing ring 14.

A preferred type of seal avoiding this difficulty is shown in FIG. 2. Therein the rotatable shaft 2a is supported by a bearing located in a bearing chamber, one side of which is formed by member 8 carrying a labyrinth seal 9 as shown in and described under FIG. 1. The shaft 2a has a tapered section 18a corresponding to section 18 of shaft 2 and fitting the tapered labyrinth bearing 19 carried by insulating wall 13.

Shaft 2a has a circumferential groove 41 adapted to engage an annular seal member, illustrated as O-ring 42 surrounding the shaft. An annular member designated generally as 43 is disposed around the shaft and O-ring at a distance from wall 13 shown at 44 sufficient to permit the relative movements between shaft and wall 13 described below.

Member 43 has an inner groove 45 opposed to groove 41 in shaft 2a. While groove 45 may have any shape desired providing room for additional compression of O-ring 42 during assembly of member 43, and O-ring 42 on shaft 2a by sliding along the short cylindrical section 46 of the shaft, it is preferred that groove 45 be rectangular in cross section as shown and that the groove 41 have arcuate configuration so that a cross section of the groove is substantially a segment of a circle, as these relative configurations provide ease in assembly. The inner diameter of member 43 and depth of grooves 42 and 45 are such that the O-ring 42 is maintained under strong pressure and is deformed, as illustrated, at all times. As a result friction between shaft 2a, O-ring 42 and annular member 43 is sufficiently great that member 43 rotates with shaft 2a without slippage even at very high speeds, such as 50,000 to 60,000 r.p.m. Obviously, the O-ring must have sufficient "Shore" hardness to resist compression due to centrifugal force, and be forced to flatten into the outer groove leaving contact with the shaft. Annular member 43 has two members 47 and 48 projecting laterally toward insulating wall 13. The outer surface 49 of member 47 is smooth and is opposed to a clearance type seal illustrated as labyrinth seal 50 attached to and in leak-proof relationship with wall 13. The length of seal 50 and of the lateral member 47 are such that sufficient space or clearance 51 is provided between member 43 and the end of seal 50 that the later described movement of the wall with respect to the shaft does not cause contact of end of seal 50 with member 43.

The outer surface of seal 50 has a shoulder 52 opposed to an inner surface of laterally projecting member 48. These respective outer and inner surfaces are spaced from each other sufficiently that there is no contact during normal operation of the machine. Shoulder 52 provides a space 53 which serves the function of gutter 17 in FIG. 1.

If under unusual circumstances oil should escape through labyrinth seal 9 and flow along shaft 2 toward wall 13, it will be thrown outward by the rapidly rotating member 43 to impinge upon the wall 13 and will flow downward along 13 until it collects in gutter 53 and is thereby conducted around the opening in the wall through which shaft 2a extends.

It will be seen that this is an extremely effective device for preventing oil from moving along the shaft 2a toward wall 13. Since O-ring 42 is under strong compression the clearance between member 43 and the shaft 2a is sealed at all times so that no oil can pass through. The oil will then tend to flow outward along the surface of member 43 perpendicular to the shaft 2a and the high speed of this member will throw the oil outward in a direction such that it will strike on the inclined surface of wall 13 and run down into gutter 53. Seal gas admitted through conduit 21 into seal 19 flows through this seal through the space 44 between member 43 and wall 13 through the seal 50 and space 51 and is discharged outward into gutter 53. Thus there is no opportunity for any oil to enter seal 19.

As shown in FIG. 1, wall 13 is circular and is provided with a flange 23, of larger diameter than the interior of the turbine case, opposed to flange 24 on turbine case 3. A series of shims 25 are disposed between opposing flanges 23 and 24 and between flange 23 and opposed ring member 30 attached to ends of members 12, and screws 26 are disposed at intervals around the periphery of wall 13 to hold the ring 30 and wall 13 in rigid attachment to flange 24. A similar series of screws 27 hold a ring 30 continuous with members 12 in rigid attachment to wall 13. It will be seen that this arrangement not only provides for adjustment of the position of wall 13 carrying the conical seal 19 with respect to the longitudinal axis of shaft 2, thus providing for adjustment in clearance between seal 19 and tapered section 18 of the shaft but also permits the removal of the entire assembly of turbine wheel, shaft, heat insulating wall, and bearing case by merely removing screws 26, thus allowing inspection of the turbine wheel, seals and bearings without the necessity for dismantling the remainder of the turbine case or disconnection of any insulated piping normally connected thereto. Convenient inspection and repair are thus provided and the arrangement permits the substitution of a repaired bearing and rotating assembly in place of worn ones so that shut-down time may be minimized and repairs made at the operator's convenience.

It is customary to provide cryogenic turbo-expanders with an insulation case, usually substantially rectangular, surrounding the turbine case. In the present invention, the insulation case 31 around the turbine case is sealed to the case proper by means of a flexible annular diaphragm 32 which is clamped between opposed annular members or rings 34 and 34a. The diaphragm 32 is illustrated as broken away to indicate that the insulation case 31 may be located at any distance from case 3 desired, which in ordinary cryogenic practice will be at a distance to permit installation of six to twelve inches of insulation (not shown) between case 31 and case 3. It is to be understood that diaphragm 32 extends upward for a distance to permit withdrawal of the end member 3a of case 3 by removing screws 31a attaching diaphragm 32 to case 31.

The opposed annular members or rings 34 and 34a are held tightly together by screws 33a and annular member 34 is supported by and clamped to case 3 by screws 33, preferably made of a material having low heat conductance, which not only support the annular member 34 but clamp it tightly against ring 35 also preferably made of a material having low heat conductance. Case 31, diaphragm 32 and ring 35 cooperate to encase the insulation space in a hermatically sealed manner to prevent damp air from getting in, forming dew and snow and finally making the insulation heavy and causing it to slump.

Ring 35 thus defines a cylindrical space through which the rotating assembly can be withdrawn. To prevent the space between 25 and the outer edge of wall 13 from becoming filled with frost which would lock the assembly in place, an easily removable annular gasket 36 is inserted between the annular member 34 and the ring member 37 in which the supporting members 12 end.

The wall 13 is illustrated as having a conical exterior which permits location of the bearing 5 near to the turbine 1. This wall also has considerable thickness so that the outside of the wall is at ambient temperature and the inside facing turbine 1, is at very low temperature. A temperature gradient thus exists in wall 13 and the thinner the wall the greater this gradient will be per inch of wall thickness. Wall 13 is made of any suitably strong material having low heat conductance and measurable coefficient of thermal expansion.

After start-up as the inner stratum of the wall is cooled in depth, it contracts and the exterior stratum of the wall tends to remain in expanded condition. This causes the cold side to become more concave and as a result to carry the tapered seal 19 along the axis of the tapered portion of 18 of the shaft to reduce seal clearance, and thus to minimize the requirement for seal gas. This establishment of heat gradient occurs during and after start-up so that when the machine is well under way and under normal operating conditions the heat insulating wall will have reached its normal configuration and will have carried the labyrinth seal 19 to its minimum clearance. When the machine is shut down the turbine chamber warms up and the temperature gradient in the insulating wall 13 disappears as temperatures at its opposite surfaces become equalized. The wall then resumes its original shape and the tapered labyrinth seal 19 moves toward the turbine chamber thus increasing radial clearance between the seal and shaft and providing a larger clearance for the next start-up when there may be temporary runout due to over-speed, deposits in the wheel, temperature inequalities in parts and the like.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a cryogenic turbo-expander including a turbine case having a detachable heat insulating and wall with a shaft opening therethrough, a turbine wheel in the case, a shaft carrying the turbine wheel extending through said opening in the heat insulating wall in clearance type sealed relationship therewith and a bearing mounting the shaft for rotation about its axis, that improvement which comprises: the relatively sealed surfaces on said shaft and wall being of different diameters at axially spaced points respectively, and one of the opposed relatively sealed surfaces on said shaft and wall being tapered whereby axial movement of said heat insulating wall relative to said shaft will vary the clearance therebetween, means for attaching the heat insulating wall of the case adjustably with respect to the longitudinal axis of the shaft; means for supporting said bearing spaced from said heat insulating wall; and means attaching said bearing supporting means rigidly to said insulating wall with a portion of said shaft exposed to the ambient atmosphere pressure therebetween.

2. The turbo-expander of claim 1 in which a slinger ring is disposed on the shaft in a space between the means for supporting the bearing and the heat insulating wall, and a radially outwardly facing gutter is carried by the heat insulating wall in position to prevent flow back to the shaft of liquid thrown outward against said wall by said slinger ring.

3. The turbo-expander of claim 1 wherein there is a means for introducing a stream of sealing gas into the clearance type seal under pressure great enough to cause it to flow in said seal toward the turbine.

4. The turbo-expander of claim 1 in which the heat insulating wall has a conical opening therein through which the shaft extends, the shaft has a conical section of matching taper disposed in the opening, and the seal is a conical seal of clearance type disposed in the opening around the conical shaft section.

5. The turbo-expander of claim 4 in which the conical seal is a labryinth seal and there is a means for introducing a stream of sealing gas under pressure between the shaft and seal at a point intermediate the ends of the seal.

6. In a cryogenic turbo-expander including a turbine case having a detachable heat insulating wall with a shaft opening therethrough, a turbine wheel in the case, a shaft carrying the turbine wheel extending through said opening in the heat insulating wall in clearance type sealed relationship therewith and a bearing mounting the shaft for rotation about its axis, that improvement which comprises means for attaching the heat insulating wall of the case adjustably with respect to the longitudinal axis of the shaft; means for supporting said bearing spaced from said heat insulating wall; means attaching said bearing supporting means rigidly to said insulating wall; the heat insulating wall having the opening therethrough conical and the shaft having a conical section of matching taper disposed in the opening and the seal is a conical seal of the clearanre type disposed in the opening around the conical shaft section, the heat insulating wall having an outer surface exposed to the atmosphere and an innter surface exposed to temperature within the turbine case and being sufficiently thin to provide a substantial temperature gradient per inch of wall thickness moving the conical seal along the longitudinal axis of the shaft by contraction and expansion of an inner stratum of the wall with respect to an outer stratum of the wall.

7. In a cryogenic turbo-expander including a turbine case having a detachable heat insulating end wall with a shaft opening therethrough, a turbine wheel in the case, a shaft carrying the turbine wheel extending through said opening in the heat insulating wall in clearance type sealed relationship therewith and a bearing mounting the shaft for rotation about its axis, that improvement which comprises means for attaching the heat insulating wall of the case adjustably with respect to the longitudinal axis of the shaft; means for supporting said bearing spaced from said heat insulating wall; means attaching said bearing supporting means rigidly to said heat insulating wall; a substantially cylindrical wall disposed around the sides of the turbine case; said heat insulating end wall providing an annular space between said cylindrical wall and the turbine case; and an annular flexible closure member and a clamping ring disposed to close said annular space adjacent the insulating end wall, said annular clamping ring providing sufficient clearance from the periphery of the insulating end wall for free withdrawal of the insulating end wall.

8. The turbo-expander of claim 7 wherein a flexible gasket is disposed to close a space between the periphery of the insulating end wall and clamping ring.

9. The turbo-expander of claim 8 wherein the cylindrical wall is a heat insulating wall and the clamping ring is attached to the turbine case by elongate screws made of a material having low heat conductance.

10. In a cryogenic turbo-expander including a turbine case having a detachable heat insulating end wall, a turbine wheel in the case, a shaft carrying the turbine wheel extending through the insulating end wall, a first clearance type seal between the shaft and end wall, and a bearing outside the end wall mounting the shaft for rotation about its axis that improvement which comprises a circumferential groove around the shaft between the insulating end wall and bearing; and annular member having a groove around its inner circumference opposed to the circumferential groove on the shaft and a smooth outer surface; an annular sealing member under compression in the grooves in the shaft and annular member; and a second clearance type seal supported by the end wall in leakproof relationship therewith cooperative with the smooth outer surface of the annular member to seal against entrance of liquid between the annual member and end wall.

11. The turbo-expander of claim 10 wherein the groove in the annular member is rectangular in cross section and the groove in the shaft in cross section defines a segment of a circle.

12. The turbo-expander of claim 10 wherein the first and second clearance type seals are labyrinth seals and an outer surface of the second labyrinth seal provides an annular gutter around the shaft.

References Cited

UNITED STATES PATENTS

| | | | |
|---|---|---|---|
| 1,704,481 | 3/1929 | Lawaczeck | 103—111 X |
| 2,910,328 | 10/1959 | Frolich. | |
| 3,077,074 | 2/1963 | Collman et al. | |
| 3,115,097 | 12/1963 | Zagar et al. | 103—114 X |

FOREIGN PATENTS 543,607    3/1942    Great Britain.

EVERETTE A. POWELL, JR., *Primary Examiner.*